US006772189B1

(12) United States Patent
Asselin

(10) Patent No.: US 6,772,189 B1
(45) Date of Patent: Aug. 3, 2004

(54) METHOD AND SYSTEM FOR BALANCING DEFERRED PROCEDURE QUEUES IN MULTIPROCESSOR COMPUTER SYSTEMS

(75) Inventor: Albert Andre Asselin, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/461,461

(22) Filed: Dec. 14, 1999

(51) Int. Cl.[7] .............................................. G06F 9/00
(52) U.S. Cl. ...................................... 709/100; 710/260
(58) Field of Search .............................. 709/100, 105, 709/108; 710/260, 262, 263

(56) References Cited

U.S. PATENT DOCUMENTS

| | | | |
|---|---|---|---|
| 6,412,035 B1 * | 6/2002 | Webber | 710/261 |
| 6,421,702 B1 * | 7/2002 | Gulick | 709/102 |
| 6,470,397 B1 * | 10/2002 | Shah et al. | 709/250 |
| 6,502,123 B1 * | 12/2002 | Gulick | 709/102 |

OTHER PUBLICATIONS

Mark Russinovich, 1997, "Advanced DPC's", pp. 1–5.*
Curt Aubley, Aug. 1998, "Sizing Your NT RAID Array", pp. 1–7.*
Mark Russinovich, Nov. 1997, "Inside NT's Interrupt Hanlding", pp. 1–7.*
Perspective, Oct. 1998, "Server Storage and RAID Worldwide End User Analysis", pp. 1–10.*

* cited by examiner

*Primary Examiner*—Wilbert L. Starks, Jr.
*Assistant Examiner*—Ronald D Hartman, Jr.
(74) *Attorney, Agent, or Firm*—Bracewell&Patterson LLP

(57) ABSTRACT

A method and system for balancing deferred procedure queues in multiprocessor computer systems provides a greater use of multiprocessing power for the handling of hardware requests in a device driver. By creating a number of DPC (deferred procedure call) objects and work lists greater than or equal to the number of processors, a device driver can queue work items to the work lists in a round-robin fashion and maintain a queued DPC object for each work list containing work items. This balances processor assignment to DPC execution, providing enough work lists and associated DPC objects to the device driver so that each processor may concurrently perform DPC tasks for the device, or so that the DPC tasks are balanced with other system or application tasks each processor is assigned.

21 Claims, 5 Drawing Sheets

METHOD AND SYSTEM FOR BALANCING DEFERRED PROCEDURE QUEUES IN MULTIPROCESSOR COMPUTER SYSTEMS

BACKGROUND OF THE INVENTION

1. Technical Field

The present invention generally relates to computer systems, specifically operating system software and device drivers, and more particularly to interrupt handling mechanisms for devices attached to multiprocessor operating systems.

2. Description of Related Art

As computer systems have evolved and become more complex, the use of multiple processors coupled by buses within a computer has increased. State-of-the-art multiprocessor network servers and dedicated desktop workstations are in common use.

Operating systems for use with multiprocessing systems have also grown in complexity, adding API's (Application Programming Interfaces) in the operating system and support routines in the kernel of the operating system to provide information about the organization of the hardware of the computer system, and allowing control of the operating system in how it allocates tasks and resources to the processors and processes being executed by the processors.

Computer systems use device drivers to enable communication between hardware devices, such as storage devices, communications ports, network adapters, and so forth, and operating systems services and services that can be interfaced to applications software. A device driver is an installable module that contains instructions and data for controlling its particular device or multiple devices and connecting them with operating system services or application programs.

An attached or integrated piece of hardware known as an adapter may control and connect one or more devices. For example, in RAID (Redundant Array of Inexpensive Disks) array controllers produced by IBM (International Business Machines Corp.), the SCSI (Small Computer Systems Interface) adapters contain several devices, each controlling an individual SCSI bus, and each SCSI bus may connect a plurality of DASD's (Direct Access Storage Devices).

Commonly, a hardware device will provide an interrupt so that it may request service due to stimulus from an outside source. For example, a serial port driver will commonly generate interrupts on the receipt of one or more bytes of data. In addition, interrupts are used to indicate to the device driver that the device has completed a command or other task that has been previously given to the device by the driver. For example, a SCSI controller may generate an interrupt when it has completed a read or a seek operation on a disk drive, so that the driver knows that data is present to be transferred, or the device is ready to execute the next command.

These interrupts originate as an electrical signal from the device and provided to the computer system, usually via an interrupt controller that is a circuit coupled to the computer bus to which the device is attached. This controller issues another signal to tell a processor that an interrupt is pending. Operating system code, typically provided by the kernel, changes execution. context (leaving the context of lower priority application code or kernel routines, and executes code that has been "attached" to the interrupt by the device driver, known as an ISR (Interrupt Service Routine). This attachment often takes the form of an interrupt binding service provided by the kernel and called by the device driver during initialization.

When the interrupt service routine is executed, the device driver performs tasks associated with the interrupt. For example, the device driver will usually set or reset the hardware register responsible for generating the interrupt signal so that the interrupt will not be present upon exiting the ISR, which on some computer system/operating system combinations will result in the ISR being called again.

The ISR is typically executed at a very high priority within the set of tasks managed by the kernel of the operating system and it is not desirable to tie up the execution of the ISR with time-intensive tasks. Additionally, in some operating systems, certain services may not be available or may yield unstable results or system crashes if the service routines providing these services are called during the execution of an ISR. This allows the operating system to synchronize objects that may only be manipulated by lower priority tasks without having to block higher priority tasks to ensure that the objects are not corrupted by simultaneous execution of the services by multiple high priority tasks.

For this purpose, operating systems such as WINDOWS NT and WINDOWS 2000 (produced by Microsoft Corporation), provide an architecture that includes a deferred procedure call (DPC). This deferred procedure call can be queued by the ISR, and the operating system will call a routine associated with the DPC at a lower priority level, after the ISR has returned and other higher priority tasks in the system have been performed. The operating system can provide more services at this DPC level, since it is scheduled, and the operating system can delay the execution of the DPC to a greater degree than the ISR while still allowing for a higher execution priority than for example, application program code.

Typically, a device driver will create and initialize one DPC object and associated work list per interrupt that it uses. The DPC routine handles requests, command completions, and external communication responses for all of the devices supported by the interrupt. The interrupt signal line may be shared with other device drivers and devices, each driver having it's own DPC and work list associated with the interrupt. Some device drivers that control devices that do not perform sequences of tasks do not require work lists, but queue DPC objects with the system and the DPC routine can interact with hardware or values stored by the ISR to complete DPC processing.

When multiple processors execute operating system and application code, tasks are generally apportioned to the processors based on processor availability. A scheduled DPC routine may be scheduled for more than one processor, and in some cases, it is up to the DPC routine to determine that the DPC is already being executed on another processor. It is also possible to "lock" the queued DPC requests associated with a DPC object for execution on a single processor.

Locking the queued DPC requests has a disadvantage in that some devices may either momentarily or on-average receive more interrupt requests and generate more work list entries than others. For example, when a particular direct access storage device (DASD) is being accessed in a system that manages multiple DASD's and interfaces, on a momentary basis, a majority of work items will be placed on the work list associated with that device. Locking the DPC object to one processor means that only that processor will be able to service this high priority task. If the DPC object is not locked, having only one work list available for servicing an interrupt associated with a device still limits the system such that only one processor at a time will be able to service that device, since the DPC routine will generally mutually exclude other calls while a first call is being handled.

Therefore, it would be desirable to provide a method and a multiprocessor computer system to balance the handling of work items associated with a device, so that the power of the multiple processors can be brought to bear on the queued work items. This would improve performance of the particular device for which the method is implemented and further the performance of the multiprocessor computer system, as DPC's would be executed for high demand periods on multiple processors without waiting on a single DPC object and associated work list to be free. This would utilize idle time on processors that have no tasks scheduled, increasing overall system performance.

SUMMARY OF THE INVENTION

It is therefore one object of the present invention to provide a method to improve the performance of a multi-processing computer system.

It is another object of the present invention to provide a computer system with improved deferred procedure call handling.

The foregoing objects are achieved in a method for balancing deferred procedure execution within a multiprocessor computer system that creates a set of DPC (Deferred Procedure Call) objects having a useable subset of DPC objects, executes an ISR (Interrupt Service Routine) in response to an interrupt from a device, then selects a DPC object from the usable subset of DPC objects, and queues a DPC associated with the device on the selected queue. The ISR may select a least-recently-queued DPC object.

The selection may be performed by masking a counter value with a mask that provides a range of output values for selecting a least-recently-queued DPC object and a least-recently-queued work list and then incrementing said counter value so that another queue and work list are specified for the next ISR. The mask may be created by determining the number of processors present in the computer system so that said usable subset of DPC objects has a quantity of DPC objects greater than or equal to the number of processors. The number of DPC objects created, however, may be equal to a maximum number of processors that may be installed in said multiprocessing computer system.

The multiprocessor system may be executing an operating system providing interrupt handling services, and the DPC may be queued by executing a call to a service provided by the operating system for queueing DPC's, and the DPC's may be created by calling the a service provided by the operating system for initializing DPC's. The multiprocessor computing system may be coupled to a RAID (Redundant Array of Inexpensive Disks) subsystem and the creating, selecting and queuing of the DPC's may be performed by a device driver associated with the RAID subsystem.

The method may be embodied in a multiprocessor computer system, or additionally in a computer program product having signal bearing medium containing program instructions for executing the steps of the method.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like parts throughout, and:

DESCRIPTION OF AN ILLUSTRATIVE EMBODIMENT

The method of the present invention may be implemented by a multiprocessor computer system executing a sequence of program instructions for carrying out the steps of the method of the present invention, and may be embodied in a computer program product comprising media storing the program instructions.

Figure 1:
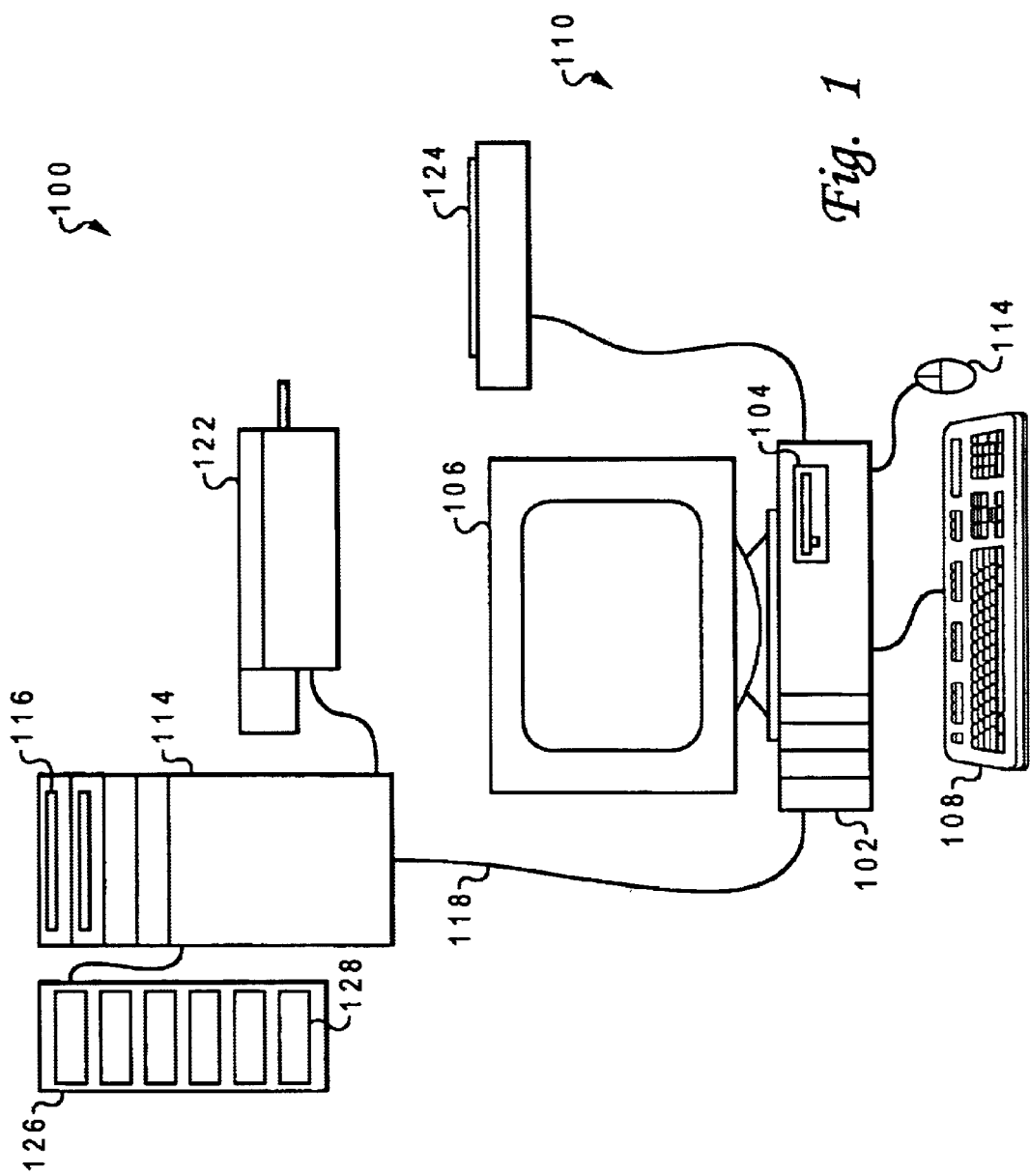
FIG. 1 is a pictorial diagram of a multiprocessor computer system in which the present invention can be practiced.

Referring to FIG. 1, a multiprocessor computer system 100 is depicted on which the method of the present invention may be carried out. Processing unit 102 serving as a workstation, houses one or more processors, memory and other systems components that implement a general purpose processing system that may execute a computer program product comprising media, for example a floppy disk that may be read by processing unit 102 through floppy drive 104. The program product may also be stored on hard disk drives within processing unit 102 or may be located on a remote system 114 such as a multiprocessor server 116, coupled to processing unit 102, via a network interface, such as an ethernet interface. Server 116 may execute program instructions for carrying out the method of the present invention for its attached devices and processing unit 102 may execute program instructions for carrying out the method of the present invention for its attached devices.

Monitor 106 and keyboard 108 are coupled to processing unit 102, to provide user interaction. Scanner 124 and printer 122 are provided for document input and output. Printer 122, is shown coupled to processing unit 120 via a network connection 118, but may be coupled directly to processing unit 102. Scanner 124 is shown coupled to processing unit 102 directly, but it should be understood that peripherals may be network coupled or direct coupled without affecting the ability of multiprocessor computer 100 or server 116 to perform the method of the invention.

Server 116 provides a coupling to RAID (Redundant Array of Inexpensive Disks) subsystem 126 containing several DASD's (Direct Access Storage Devices) 128 and may execute the method of the present invention by receiving instructions via the computer program product of the present invention.

Figure 2:
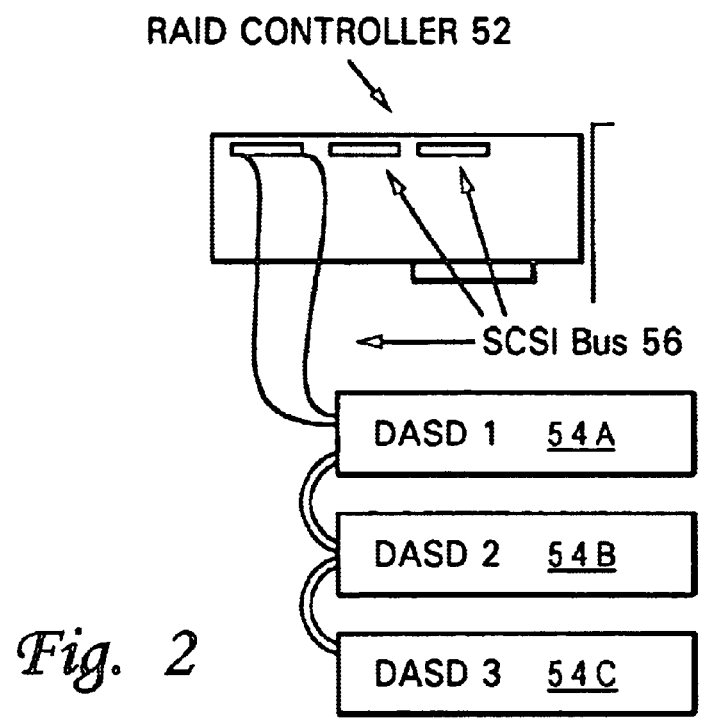
FIG. 2 is a pictorial diagram depicting a RAID subsystem that can be controlled by the method of the present invention.

Referring now to FIG. 2, the components of a RAID array in accordance with one embodiment of the present invention are shown. RAID controller 52, generally configured as a plug-in card for a computer bus, for example a PCI (Personal Computer Interconnect) bus, provides three SCSI bus 56 interfaces from a multiprocessor computer system to a series of DASD's 54A, 54B, and 54C. DASD's 54 are shown as being coupled to RAID Controller 52 via one of the SCSI Bus connections 56, but may be connected via some other bus architecture such as IDE (Integrated Device Electronics) or Firewire (IEEE 1394).

Figure 3:
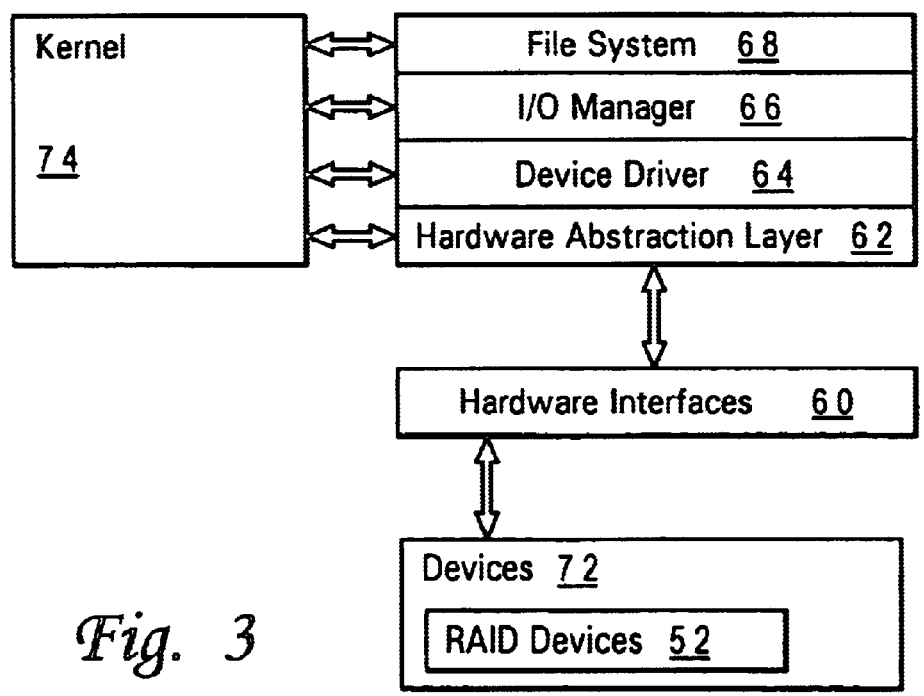
FIG. 3 is a block diagram showing the relationship of software and hardware components of the present invention.

A device driver is provided in the software installed on the multiprocessor computer system 100 or 116, to enable control of RAID Controller 52. Referring now to FIG. 3, a relationship of software layers within a WINDOWS NT or WINDOWS 2000 operating system, configured for carrying out the present invention is depicted. File system 68 provides top-level file services to the operating system and application software executing on multiprocessor computer system 100 or 116. I/O manager 66, takes requests from file system 68, for example, read and write requests, and translates them to requests to a device driver 64. These requests are in the form of IRP's (Input/Ouput request packets). Device driver 64 communicates with hardware devices 72, which may include RAID controller 52, via the hardware interfaces 60 to which the device is coupled, for example a PCI bus interface, and the connection to the interface is provided by HAL (Hardware Abstraction Layer) 62. HAL 62, provides a set of services that allow connection to hardware interrupts and I/O and/or memory-mapped locations associated with the hardware interfaces 60, as well as providing services for controlling DMA (Direct Memory Access) transfers. Device driver 64, usually during driver initialization, connects to a hardware interrupt by calling a service provided by HAL identified as HalGetInterruptVector( ), which takes parameters identifying the particular hardware interface 60 through which a device 72 is coupled, and the particular hardware interrupt coupled to the interface 60, and returns an interrupt vector. Once the interrupt vector is obtained, the device driver calls a service provided by I/O Manager 66, IoConnectInterrupt( ), providing the address of an ISR (Interrupt Service Routine) to be associated with the interrupt. Most interrupt service routines in device drivers also have a DPC (Deferred Procedure Call) object and work list associated with the interrupt. At initialization time, the device driver calls the kernel 74 service KeInitializeDpc( ) with a pointer to a DPC routine to be called when the particular DPC is queued and ExInitializeSListHeado to initialize the work list associated with the DPC. This is an S-list object that may be used to store work items, but it should be understood that other mechanisms for storing and synchronizing access to work items may be used to practice the method of the present invention.

When a hardware interrupt is generated by device 72, I/O Manager 66 calls the ISR in device driver 64, which generally performs only tasks having very low overhead. The ISR queues a work item on a selected work list and then queues a selected DPC by calling KeInsertQueueDpc( ) with a parameter corresponding to a DPC object that has been created, if the work list was empty prior to queuing the work item on the work list. If the list was not empty, the DPC object has already been queued, since the DPC routine will remove all items from the list when it is called. This prevents the ISR from queuing the same DPC multiple-times. The DPC routine, also in device driver 64, performs any time-consuming tasks that are required for each work item, or tasks which require kernel 74 or other services to perform tasks that cannot be performed at interrupt time, such as IoCompleteRequest( ), provided by I/O Manager 66, to complete IRP's which were issued to device driver 64. IocompleteRequest( ) will cause a complete system crash if called from the ISR.

A usual handling mechanism for IRP's is as follows: driver 64 receives an IRP, starts a transaction on device 72, and returns. When device 72 has completed the transaction, it generates a hardware interrupt, causing the ISR to be called. Kernel 74 then calls the DPC routine at a lower priority when higher priority tasks are completed (such as the ISR itself).

Several interrupt occurances may cause several work items to be queued for a DPC on its associated work list at any time, if the interrupts arrive before DPC processing is complete for the prior DPC. For example, an architecture common to device drivers implemented for WINDOWS NT or WINDOWS 2000 creates one DPC object and work list per adapter. The result of this is to queue up interrupt responses by processing the ISR but not the DPC, until the system becomes less busy. One solution to this is to use multiple DPC objects and work lists per adapter, for example, one DPC and work list per device attached to the adapter. For the RAID controller 52, this could be accomplished by creating a DPC object and work list for each SCSI bus 56 located on the controller 52, or by creating a DPC object and work list for each individual LUN (Logical Unit Number) on the SCSI bus to which the individual DASD's 54 are assigned. This solution, however, does not solve the problem of a DPC's work list increasing in depth when an individual device is performing a large I/O load at a given instant. Multiple processors could be performing DPC operations for each work item queued on the work list, but because the solitary DPC object and work list for the device is busy, only one processor will be executing the DPC routine for that device.

Figure 4:
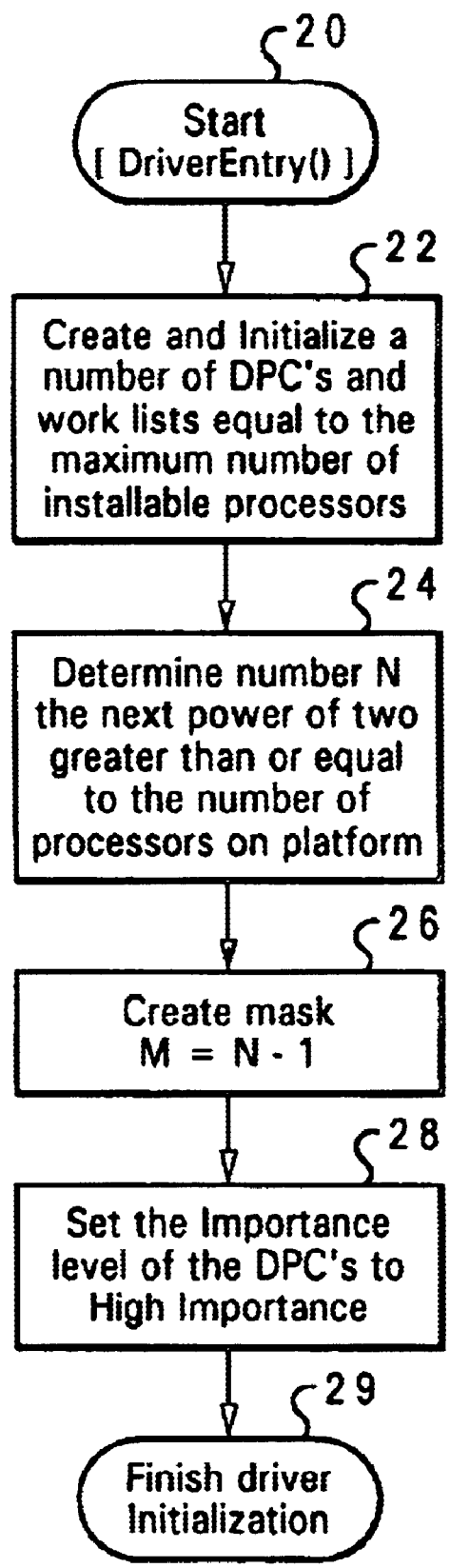
FIG. 4 is a flow diagram showing steps of a method in accordance with an embodiment of the present invention.

The present invention solves this problem by creating a set of DPC objects and associated work lists determined by the number of processors installed in the machine, not the number of interrupts or devices that are being used. Referring now to FIG. 4, a method in accordance with an embodiment of the invention is shown. At driver initialization time (DriverEntry( ) is the initialization entry point for drivers in NT systems)(start 20), the driver creates and initializes a number of DPC objects and associated work lists equal to the maximum number of processors that might be installed on the system (step 22), then the number of processors actually present on the system is determined (step 24) and a mask is created that is equal to one less than the next power of two greater than or equal to the number of processors (step 26). This mask when combined in a logical AND operation with a counter will provide a range of output values which can index an array of DPC objects greater than or equal to the next power of two larger than the number of processors. The number of processors installed on the system is determined by examining KeNumberProcessors, a value provided by kernel 74.

The importance level of the DPC objects can be set to HIGH_IMPORTANCE (step 28), making the operating system process the DPC's as soon as a processor is available. This is done to assist in disassociating the DPC from the processor that executed the ISR, since the operating system will tend to execute low importance DPC's on the processor which executed the ISR. This can be accomplished by setting the Importance member of the KDPC structure initialized by KeInitializeDpc( ) directly.

The number of DPC objects and work lists created could be equal to the number of processors and ensure that there is at least one DPC object and work list per processor, but it is efficacious to create a number of DPC objects and work lists that is equal to a power of two. This allows a fast masking operation to be performed without having to detect when the last object in the list or array has been reached in order to handle the wraparound condition.

As an example, if there are 6 processors installed on a system that will support 32 processors, the method of the present invention will initialize 32 DPC objects and work lists and create a mask equal to 7. (This is computed by determining that there are 6 processors, taking the next higher power of two (which is 8), then subtracting one.) If a counter is initialized to zero and then incremented for each work item queued by an ISR, the first work item will be queued on WorkList[0], proceeding using WorkList[ counter value & mask ] where mask is 7 and & is the logical AND operator and WorkList[n] indicates the $n^{th}$ member of an array of work lists. When 4 the counter is incremented from 7 to 8, after using WorkList[7], the next work item will be placed on WorkList[0] again and so forth. When the counter rolls over, the WorkList[7] to WorkList[0] sequence will be maintained, since the number of work lists in the useable subset of DPC objects and associated work lists is a power of two. If any WorkList[m] is empty when an item is pushed on the work list, the DPC object with which the work list is associated DPC[m] is queued on the system DPC queue by calling KeInsertQueueDpc( ).

Figure 5:
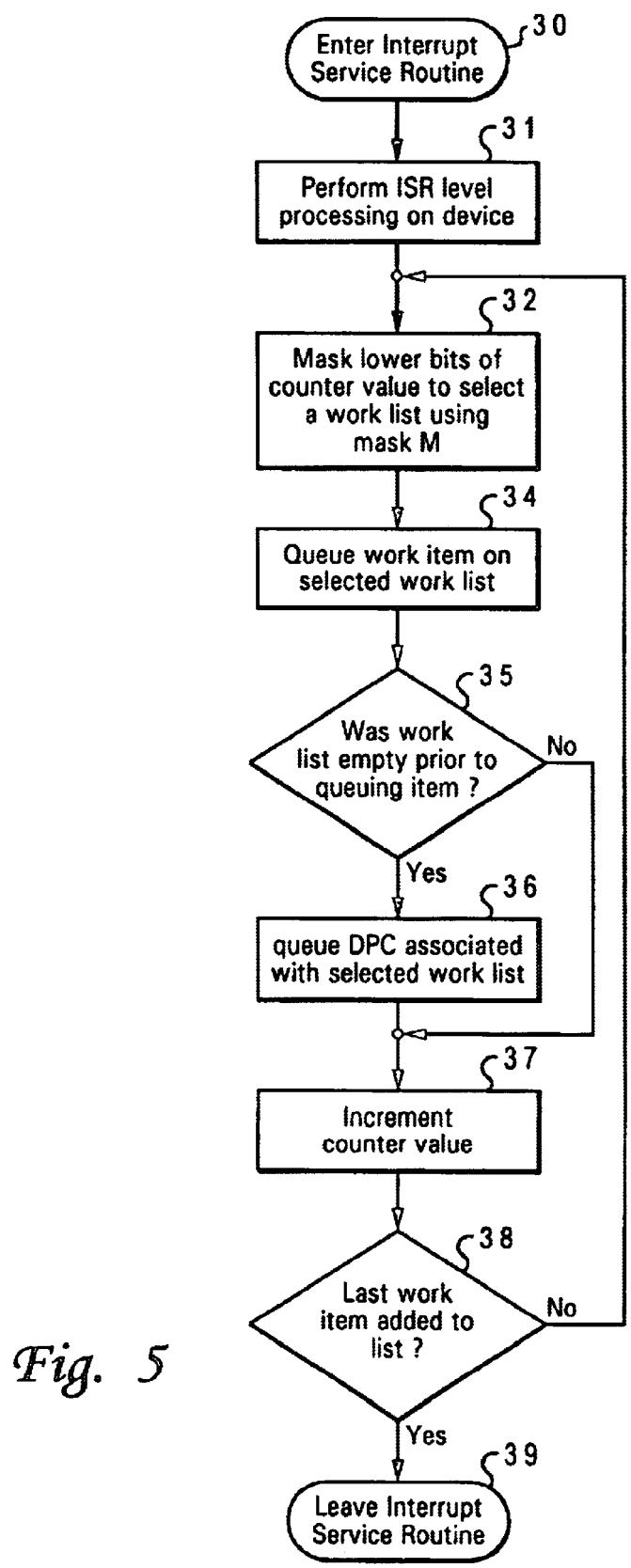
FIG. 5 is a flow diagram showing steps of a method in accordance with an embodiment of the present invention.

Referring now to FIG. 5, the operation of the ISR in accordance with one embodiment of the present invention is shown. The interrupt service routine is entered 30, when called by the I/O manager (step 30). The ISR performs any device level processing required, such as resetting a hardware interrupt generating register (step 31). Then the lower bits of a counter value that continuously counts the number of work items for which device responses have been obtained is masked with the mask created in step 26 to create a selector that is used to select the least-recently-used work list (step 32). The work item is queued on the selected work list (step 34), and if the work list was empty prior to queuing the work item (decision 35), the associated DPC object is queued on the system DPC queue (step 36). The counter value is incremented (step 37), and this queuing is repeated in a round-robin fashion for every work item that needs to be performed for the device (decision 38), then the interrupt service routine returns (step 39). In this manner, a work item is queued for every task (generally each command completion) received as a response from the device at interrupt time, and for each work list that contains a work item, one and only one DPC object will be queued on the system DPC queue. Thus, multiple processors can be handing the command completion tasks instead of just one processor executing a single DPC routine and working on a single work list of work items.

Figure 6:
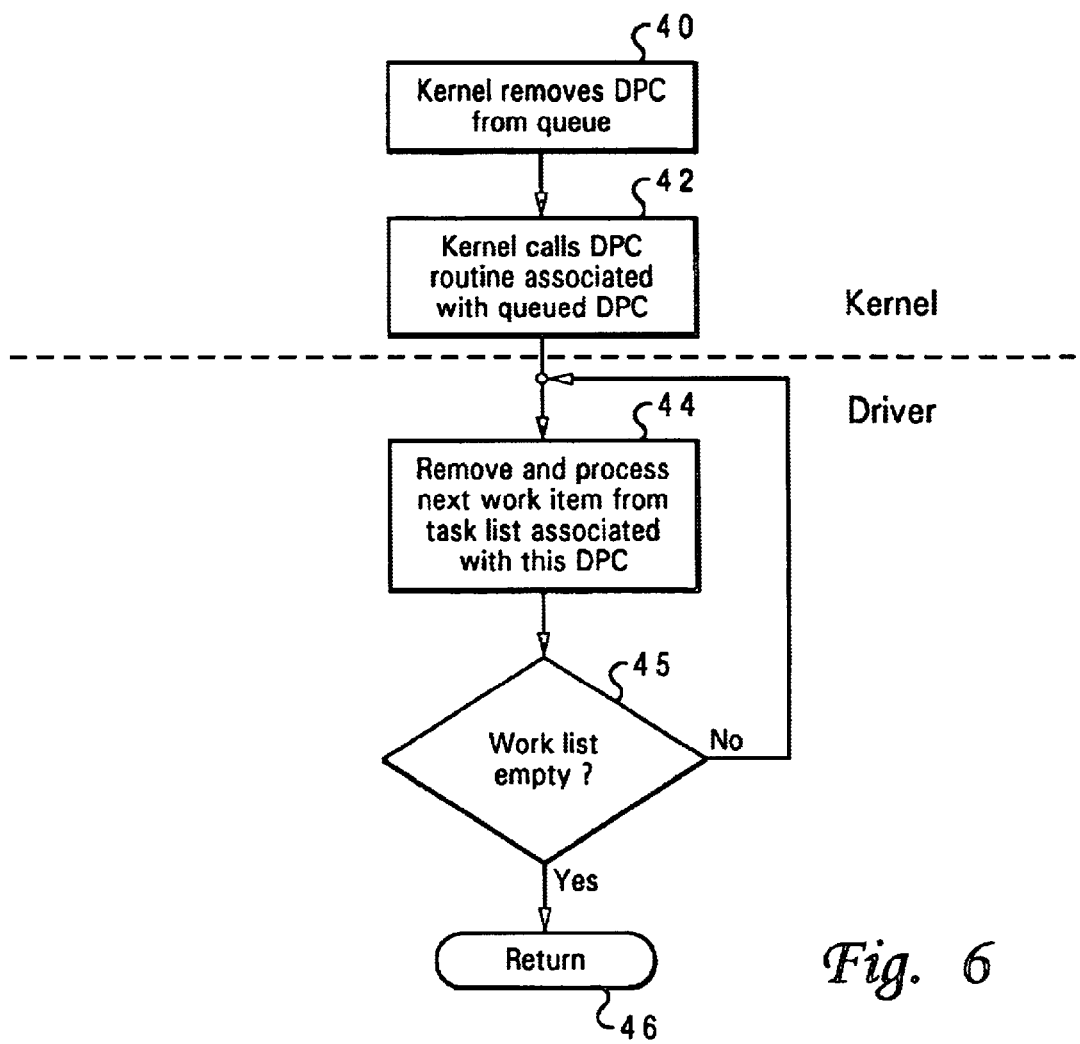
FIG. 6 is a flow diagram showing steps of a method in accordance with an embodiment of the present invention.

Referring now to FIG. 6, the execution of the DPC routine is depicted. The kernel removes the DPC object from the queue (step 40), and calls the DPC routine associated with the DPC object (step 42). The DPC routine removes and processes each work item from the work list, leaving the work list empty (step 44 and decision 45), then the DPC routine returns (step 46). Because the work items are queued on the work lists and any required DPC objects are queued on the system DPC queue in a round-robin fashion, and the set of work lists and DPC objects created in step 22 has a selectable subset large enough for each processor in the system to be executing the DPC routine independently for each DPC object and work list, the full power of a multi-processing system is made available for handling interrupt responses from a single device that is momentarily processing a large number of tasks, and the DPC loading is balanced for that device or any number of devices handled by the device driver.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. For example, the invention may be embodied in the operating system kernel and services provided may create a set of device queues for a device in conformity with the number of processors present in the computer system. In addition, the invention is not restricted to device drivers implemented for WINDOWS platforms, but will encompass any architecture which uses deferred execution queued by an interrupt service routine. For example, on an AIX (manufactured by International Business Machines) or similar system, the deferred procedure call would be equivalent to a thread created or process spawned by a high priority interrupt handler. The DPC objects and queues would not necessarily be operating system defined constructs, but their equivalents would be necessary to manage execution of the deferred procedure calls.

It is therefore contemplated that such modifications can be made without departing from the spirit or scope of the present invention as defined in the appended claims.

What is claimed is:

1. A method for balancing deferred procedure execution within a multiprocessor computer system, said method comprising:

creating a set of deferred procedure call (DPC) objects having a useable subset of DPC objects, wherein said set of DPC objects equals a maximum number of processors that may be installed in said multiprocessor computer system;

executing an interrupt service routine in response to an interrupt from a device;

selecting a DPC object from said usable subset of DPC objects; and queuing said DPC object.

2. The method of claim 1, wherein said selecting further includes selecting a least-recently-queued DPC and a least-recently-queued work list;

determining whether said selected least-recently-queued work list is empty.

3. The method of claim 2, wherein said selecting further includes:

masking a counter value with a mask to provide a range of output values for selecting said least-recently queued work list from an array of work lists and said least-recently-used DPC object from said usable subset of DPC objects; and incrementing said counter value so that another DPC object from said useable subset of DPC objects and another work list from said array of work lists is specified.

4. The method of claim 1, wherein said method further includes:

determining a number of processors present in said multiprocessor computer system; and creating a mask so that said usable subset of DPC objects has a quantity of DPC objects greater than or equal to a determined number of processors.

5. The method of claim 4, wherein said selecting further includes:

masking a counter value with a mask to provide a range of output values for selecting said least-recently-queued work list from an array of work lists and said least-recently-used DPC object from said usable subset of DPC objects; and incrementing said counter value so that another DPC object from said useable subset of DPC objects and another work list from said array of work lists is specified.

6. The method of claim 1, wherein said queuing is performed by executing a call to a service provided by an operating system for inserting a DPC into a queue, and wherein said creating is performed by executing a call to another service provided by said operating system for initializing a DPC object.

7. The method of claim 1, wherein said multiprocessor system is coupled to a redundant array of inexpensive disks (RAID) subsystem, and wherein said creating, selecting and queuing are performed by a device driver provided to interface said RAID subsystem.

8. A multiprocessor computer system comprising:
at least one device having interrupt generating means;
means for creating a set of deferred procedure call (DPC) objects having a useable subset of DPC objects, wherein said set of DPC objects equals a maximum number of processors that may be installed in said multiprocessor computer system;
means for executing an interrupt service routine in response to an interrupt from a device;
means for selecting a DPC object from said usable subset of DPC objects; and
means for queuing said DPC object.

9. The multiprocessor computer system of claim 8, wherein said said means for selecting selects a least-recently-queued DPC and further selects a least-recently-queued work list, and further includes means for determining whether said least-recently-queued work list is empty.

10. The multiprocessor computer system of claim 8, wherein said means for selecting further includes:
means for masking a counter value with a mask providing a range of output values for selecting a least-recently-queued DPC object from a usable set of DPC objects; and
means for incrementing said counter value so that another DPC object from said useable subset of DPC objects is specified.

11. The multiprocessor computer system of claim 8, wherein said multiprocessor computer system further includes:
means for determining a number of processors present in said multiprocessor computer system; and
means for creating a mask so that said usable subset of DPC objects has a quantity of DPC objects greater than or equal to said determined number of processors.

12. The multiprocessor computer system of claim 11, wherein said said means for selecting further includes:
means for masking a counter value with a mask providing a range of output values for selecting said least-recently-queued work list from an array of work lists and said least-recently-used DPC object from said usable subset of DPC objects; and
means for incrementing said counter value so that another DPC object from said useable subset of DPC objects and another work list from said array of work lists is specified.

13. The multiprocessor computer system of claim 8, wherein said means for queuing further includes means for executing a call to a service provided by an operating system for inserting a DPC into a queue, and wherein said means for creating further includes means for executing a call to another service provided by said operating system for initializing a DPC object.

14. The multiprocessor computer system of claim 8, wherein said at least one device includes a redundant array of inexpensive disks (RAID) subsystem, and wherein said means for creating, selecting and queuing are performed by a device driver provided to interface said RAID subsystem.

15. A computer program product, for use with a multiprocessor computer system having a plurality of processors and at least one device having interrupt generating means, comprising signal bearing media containing program instructions for execution on said multiprocessor computer system for balancing deferred procedure execution, said computer program product comprising:
program code means for creating a set of deferred procedure call (DPC) objects having a useable subset of DPC objects, wherein said set of DPC objects equals a maximum number of processors that may be installed in said multiprocessor computer system;
program code means for executing an interrupt service routine in response to an interrupt from a device;
program code means for selecting a DPC object from said usable subset of DPC objects; and
program code means for queuing said DPC object.

16. The computer program product of claim 15, wherein said program code means for selecting further includes
program code means for selecting a least-recently-queued DPC and further select a least-recently-queued work list, and
program code means for determining whether said least-recently-queued work list is empty.

17. The computer program product of claim 15, wherein said program code means for selecting further includes:
program code means for masking a counter value with a mask providing a range of output values for selecting a least-recently-queued work list from an array of work lists and a least-recently-used DPC object from said usable subset of DPC objects; and
program code means for incrementing said counter value so that another DPC object from said useable subset of DPC objects and another work list from said array of work lists is specified.

18. The computer program product of claim 15, wherein said computer program product further includes:
program code means for masking a counter value with a mask providing a range of output values for selecting a least-recently queued work list from an array of work lists and a least-recently-used DPC object from said usable subset of DPC objects; and
program code means for incrementing said counter value so that another DPC object from said useable subset of DPC objects and another work list from said array of work lists is specified.

19. The computer program product of claim 18, wherein said program code means for selecting further includes:
program code means for determining a number of processors present in said multiprocessor computer system; and
program code means for creating a mask so that said usable subset of DPC objects has a quantity of DPC objects greater than or equal to said number of processors determined by said determining step.

20. The computer program product of claim 15, wherein said program code means for for queuing further includes program code for executing a call to a service provided by said operating system for inserting a DPC into a queue, and said program instructions for said creating step execute a call to another service provided by said operating system for initializing a DPC object.

21. The computer program product of claim 15, wherein said at least one device includes a redundant array of inexpensive disks (RAID) subsystem, and wherein said creating, selecting and queuing are performed by a device driver provided to interface said RAID subsystem.

* * * * *